US011513889B2

(12) United States Patent
Yeung et al.

(10) Patent No.: US 11,513,889 B2
(45) Date of Patent: Nov. 29, 2022

(54) PARITY PROTECTION

(71) Applicant: Micron Technology, Inc., Boise, ID (US)

(72) Inventors: Chun Sum Yeung, Milpitas, CA (US); Falgun G. Trivedi, Eagle, ID (US); Harish Reddy Singidi, Fremont, CA (US); Xiangang Luo, Fremont, CA (US); Preston Allen Thomson, Boise, ID (US); Ting Luo, Santa Clara, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/458,224

(22) Filed: Aug. 26, 2021

(65) Prior Publication Data

US 2021/0390014 A1   Dec. 16, 2021

Related U.S. Application Data

(63) Continuation of application No. 16/723,836, filed on Dec. 20, 2019, now Pat. No. 11,106,530.

(51) Int. Cl.
*G06F 11/10* (2006.01)
*G06F 12/02* (2006.01)
(Continued)

(52) U.S. Cl.
CPC ........ *G06F 11/1032* (2013.01); *G06F 11/076* (2013.01); *G06F 11/1016* (2013.01);
(Continued)

(58) Field of Classification Search
CPC .............. G06F 11/1032; G06F 11/076; G06F 11/1016; G06F 11/1044; G06F 12/0246; G06F 12/0882
(Continued)

(56) References Cited

U.S. PATENT DOCUMENTS 5,671,239 A * 9/1997 Higashitani ......... G06F 11/1008
714/805
5,883,903 A * 3/1999 Higashitani ......... G06F 11/1008
714/710

(Continued)

*Primary Examiner* — John J Tabone, Jr.
(74) *Attorney, Agent, or Firm* — Schwegman Lundberg & Woessner, P.A.

(57) ABSTRACT

A variety of applications can include apparatus and/or methods that provide parity data protection to data in a memory system for a limited period of time and not stored as permanent parity data in a non-volatile memory. Parity data can be accumulated in a volatile memory for data programmed via a group of access lies having a specified number of access lines in the group. A read verify can be issued to selected pages after programming finishes at the end of programming via the access lines of the group. With the programming of the data determined to be acceptable at the end of programming via the last of the access lines of the group, the parity data in the volatile memory can be discarded and accumulation can begin for a next group having a specified number of access lines. Additional apparatus, systems, and methods are disclosed.

20 Claims, 10 Drawing Sheets

(51) Int. Cl.
*G06F 12/0882* (2016.01)
*G06F 11/07* (2006.01)

(52) U.S. Cl.
CPC ...... *G06F 11/1044* (2013.01); *G06F 12/0246* (2013.01); *G06F 12/0882* (2013.01)

(58) Field of Classification Search
USPC ........ 714/805, 766, 768, 769, 773, 799, 800
See application file for complete search history.

(56) References Cited

U.S. PATENT DOCUMENTS

| | | | | |
|---|---|---|---|---|
| 8,775,901 | B2* | 7/2014 | Sharon | G11C 29/82 |
| | | | | 714/763 |
| 9,323,613 | B2* | 4/2016 | Hu | G11C 29/785 |
| 10,275,310 | B2* | 4/2019 | B | G06F 11/108 |
| 10,915,394 | B1* | 2/2021 | Shappir | G11C 29/44 |
| 2005/0055621 | A1* | 3/2005 | Adelmann | G06F 11/1008 |
| | | | | 714/758 |
| 2008/0056025 | A1* | 3/2008 | Kanagawa | G06F 11/1044 |
| | | | | 365/189.15 |
| 2009/0055706 | A1* | 2/2009 | Lin | G06F 11/1072 |
| | | | | 714/758 |
| 2013/0031429 | A1* | 1/2013 | Sharon | G06F 11/1048 |
| | | | | 714/718 |
| 2014/0075259 | A1* | 3/2014 | Tam | G06F 11/1044 |
| | | | | 714/747 |
| 2015/0261603 | A1* | 9/2015 | Yaegashi | G06F 11/1012 |
| | | | | 714/764 |
| 2016/0266965 | A1* | 9/2016 | B | G06F 11/108 |
| 2017/0140807 | A1* | 5/2017 | Sun | G11C 29/023 |
| 2017/0322843 | A1* | 11/2017 | Hsu | G06F 11/108 |
| 2018/0053545 | A1* | 2/2018 | Son | G11C 11/419 |
| 2018/0089078 | A1* | 3/2018 | Ohno | G06F 3/064 |
| 2019/0258538 | A1* | 8/2019 | Byun | G11C 5/04 |
| 2019/0377632 | A1* | 12/2019 | Oh | G06F 11/1048 |
| 2020/0210280 | A1* | 7/2020 | Singidi | G06F 11/108 |
| 2021/0191807 | A1 | 6/2021 | Yeung et al. | |

* cited by examiner

PARITY PROTECTION

PRIORITY APPLICATION

This application is a continuation of U.S. application Ser. No. 16/723,836, filed Dec. 20, 2019, which is incorporated herein by reference in its entirety.

FIELD OF THE DISCLOSURE

Embodiments of the disclosure relate generally to memory systems, and more specifically, related to management of parity protection of memory systems.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
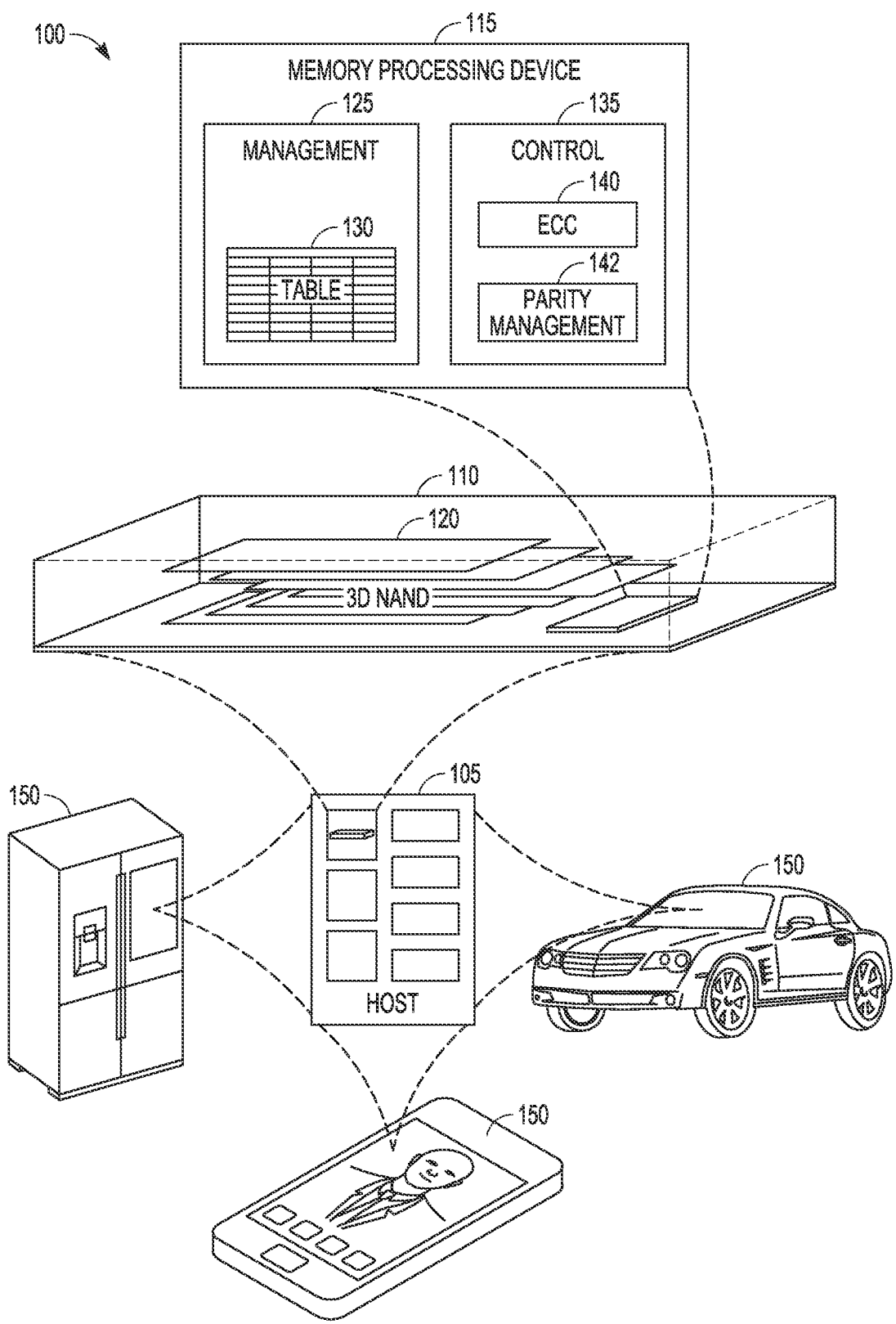
FIG. 1 illustrates an example of an environment including a memory device, according to various embodiments.

The following detailed description refers to the accompanying drawings that show, by way of illustration, various embodiments that can be practiced. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, parity data can be accumulated in a volatile memory for a certain number, X, of access lines (WLs) used in data programming into a non-volatile memory. The volatile memory can be a SRAM. A read verify can be issued to selected pages after programming finishes at the end of every X WLs. If there are no program fails (PF) or uncorrectable error-correcting code (UFCC) errors observed at the end of programming the $X^{th}$ WL, the parity data in SRAM can be discarded and accumulation of parity data in the SRAM can restart for the next group of X WLs. This parity data protection design can be implemented such that the design does not cost any over-provisioning in the system compared to other approaches. Such a design can be implemented as a redundant array of independent NAND (RAIN) design that may provide high performance relative to conventional approaches. RAIN is an umbrella term for data storage schemes that divide and/or replicate data among multiple pages of multiple memory devices, for instance, in order to help protect the data stored in the memory devices. The multiple memory devices in a RAIN array may appear to a user and an operating system of a computing machine as a single memory device.

For NANDs that have a high percentage of defects in the form of PF plus UECC errors (PF+UECC) instead of UECC errors without prior PF, this design can be simplified to remove the read verify portions and still handle much of the NAND defective parts per million (DPM). This design can provide simplicity and performance that does not require permanent parity data to be dumped in a non-volatile memory, such as a NAND. In general, a managed NAND system, also referred to as managed NAND, is realized as a combination of one or more individual NAND flash memory devices combined with a hardware controller that performs management features for the flash memories. SSD, UFS, and eMMC devices can be managed NAND memory systems that include processing circuitry such as one or more of memory controllers, direct memory access (DMA) controllers, and flash memory interface circuitry to manage the access to physical memory.

In the designs of these embodiments, since the parities are stored on a non-volatile memory device only, such as only in a SRAM, the parities are lost during power cycle. Hence, the technique is a single power cycle for parity data protection, such as a single power cycle RAIN. Though other forms of XOR parity data are typically saved into nonvolatile memory and can survive power cycle, such a conventional approach of saving the parity data comes with the price of data memory capacity loss, such as NAND capacity loss. A conventional RAIN scheme retains parity data over the lifetime of the stored data, which impacts over-provisioning as the system must keep this parity data at the expense of data storage space. A system using a conventional RAIN scheme can also experience lost performance due to program and read overhead. The approach, as taught herein, addresses challenges of other RAIN systems that come from performance degradation and NAND capacity loss due to parity data dump to the NAND.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality; configured to control operation of the one or more memory die. Such controller functionality can simplify interoperability with an external device, such as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume.

Embodiments of the present disclosure are described in the example of managed memory devices implementing the NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store, three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed NAND devices can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/r nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.)

between the memory devices and the host, or erase operations to erase data from the memory devices. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., Internet-of-Things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory devices, such as DRAMs, mobile or low-power double-data-rate synchronous DRAM (DDR SDRAM), etc.); and a storage device (e.g., non-volatile memory (NVM) device, such as flash memory, ROM, an SSD, an MMC, or other memory card structure or assembly, etc.). In certain examples, electronic devices can include a user interface (e.g., a display, touchscreen, keyboard, one or more buttons, etc.), a graphics processing unit (GP LI), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (Io'F) devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of 3D NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array, such as to transfer data to (e.g., write or erase) or from (e.g., read) one or more of the memory cells, planes, sub-blocks, blocks, or pages of the memory array. The memory processing device 115 can include, among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (I/O) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105 or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory processing device 115. The array controller 135 can include a parity management component 142 that can include instructions for handling parity data. The memory processing device 115 can be configured to actively detect and recover from error occurrences (e.g., bit, errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384 2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload. including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata to ensure integrity of the page of data (e.g., a memory device with a higher bit error rate may require more bytes of error correction code data than a memory device with a lower bit error rate). As an example, a MLC NAND flash device may have a higher bit error rate than a corresponding SLC NAND flash device. As such, the MLC device may require more metadata. bytes for error data than the corresponding SLC device.

Figure 2:
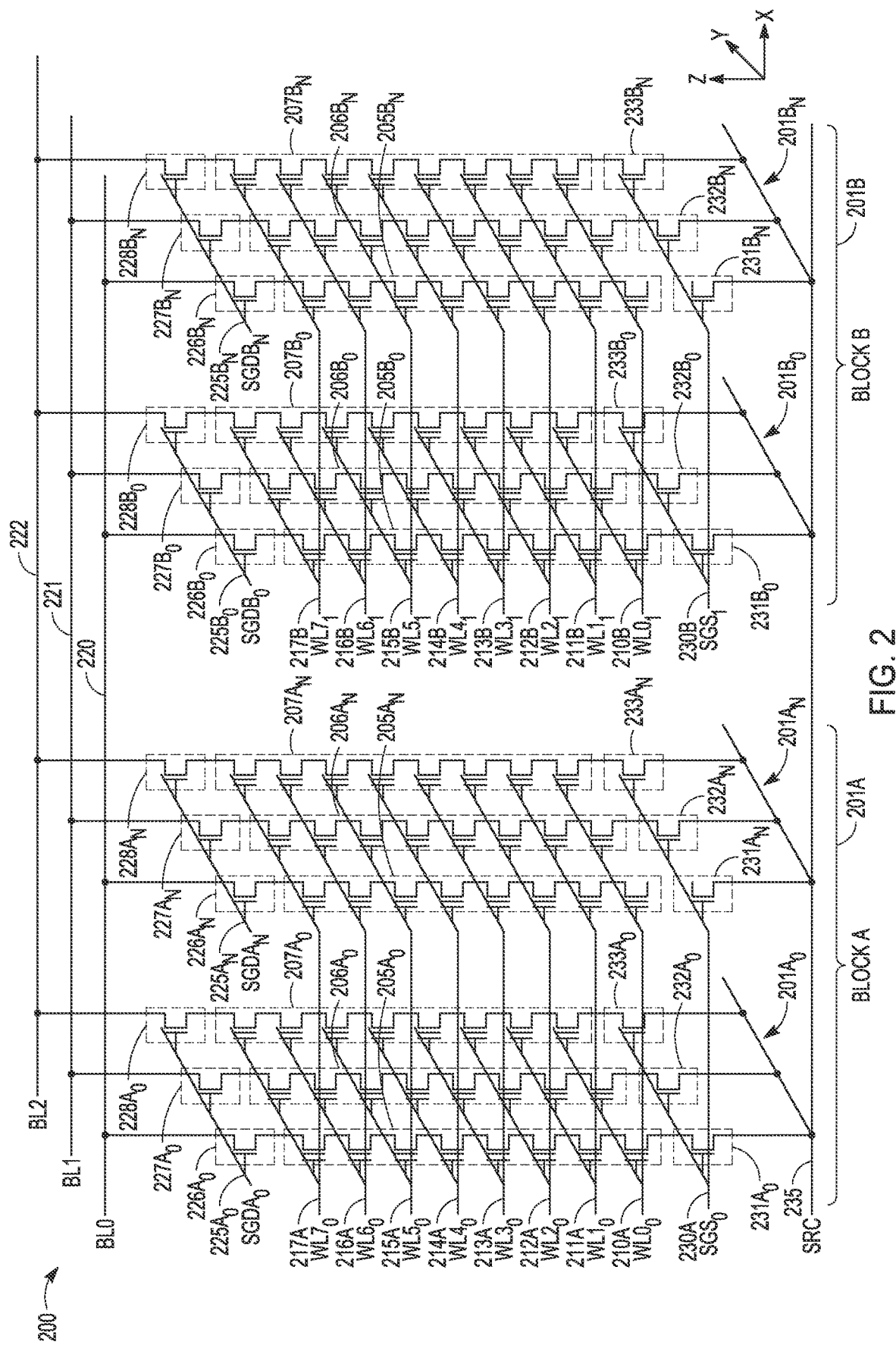
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 that can be implemented as memory array 120 of FIG. 1. The 3D NAND architecture semiconductor memory array 200 can include a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228 9_0$, first-third $B_n$ SGD $226B_n$-$228B_n$, etc.). Each string of memory cells in the 3D memory array 200 can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines. etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array 200, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD lure $SGDA_0$ $225A_0$, first-third $A_n$ SGD $226A_n$-$228A_n$ can be accessed using an $A_n$ SGD line SGD $A_n$ $225A_n$, first-third $B_0$ SGD $226B_0$-$228B_0$ can be accessed using an $B_0$ SGD line SGD $B_0$ $225B_0$, and first-third $B_n$ SGD $226B_n$-$228B_n$ can be accessed using an $B_n$ SGD SGDB $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the memory array 200 can be accessed, selected, or controlled using a combination of bit lines (BLs) and select gates, etc., and specific Memory cells at one or more tiers in the specific strings can be accessed, selected, or controlled using one or more access lines (e.g., word lines).

Figure 3:
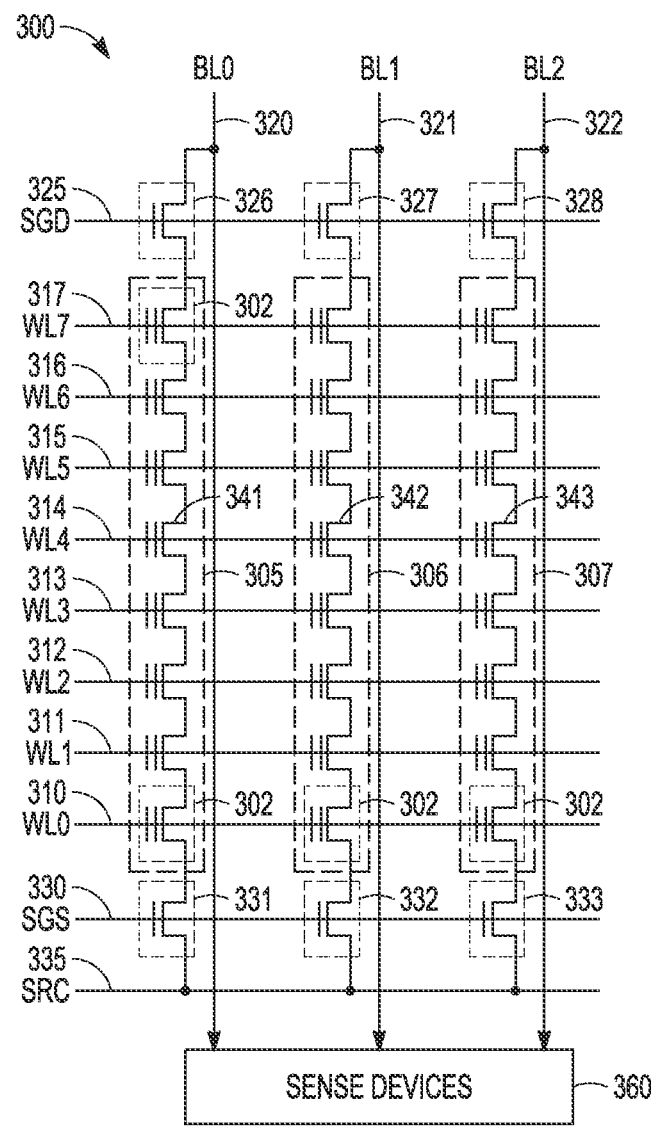

FIG. 3 illustrates an example schematic diagram of a portion of a NAND architecture semiconductor memory array 300 that can be implemented as memory array 120 of FIG. 1. The portion of the NAND architecture semiconductor memory array 300 can include a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or FN tunneling, etc.) from the floating gates of the targeted memory cells to the channels.

Figure 4:
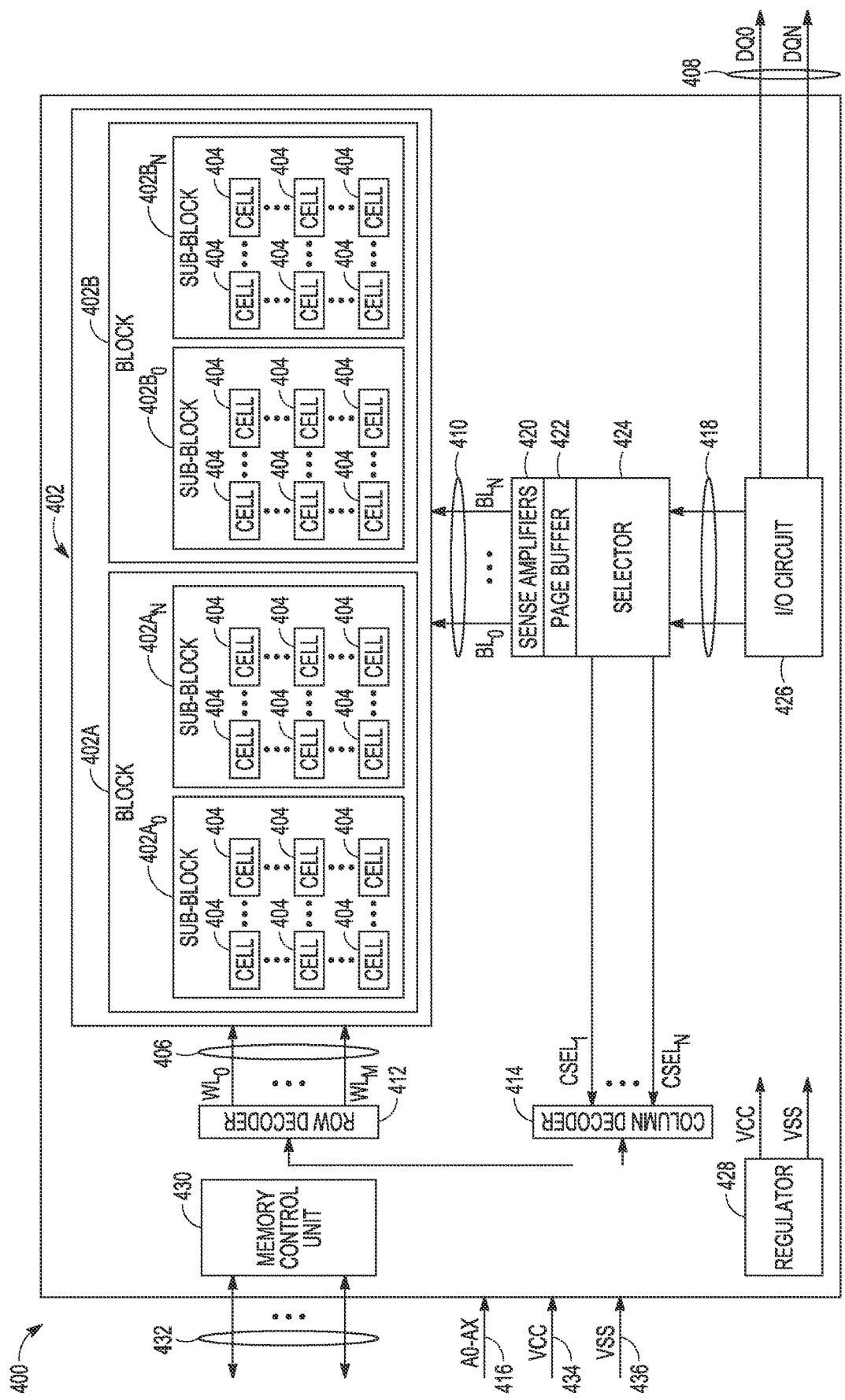
FIG. 4 illustrates an example block diagram of a memory module, according to various embodiments.

FIG. 4 illustrates an example block diagram of a memory device 400, which can be implemented memory device 110 of FIG. 1, including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (110) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432 or the address signals on the address lines 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory allay 402 through the selected string to the data lines 410.

One or more devices external to the memory device 400 can communicate with the memory device 400 using the I/O lines (DQ0-DQN) 408, address lines 416 (A0-AX), or control lines 432. The 110 circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
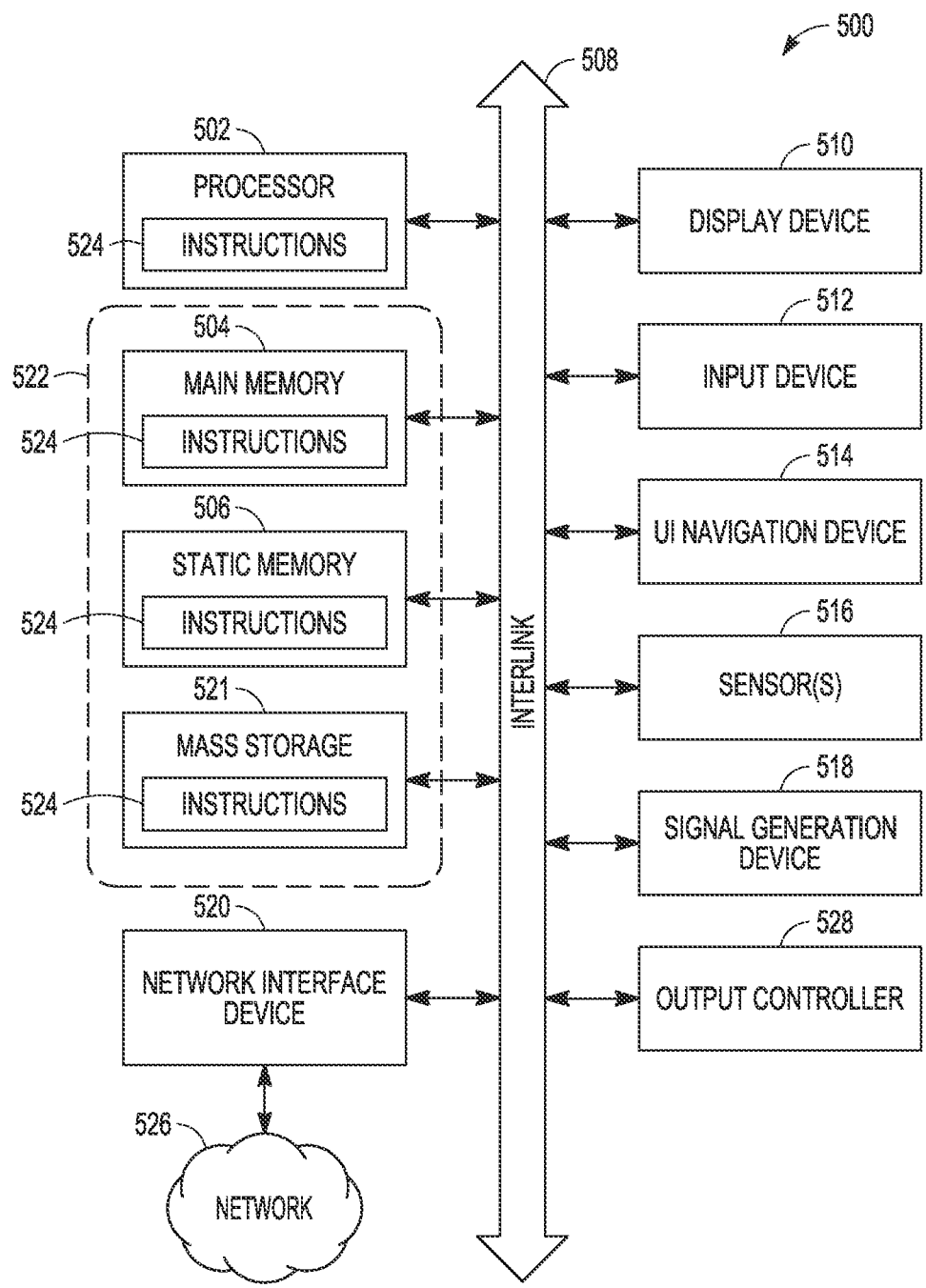
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The example machine 500 can be arranged to operate in the environment 100 of FIG. 1. The example machine 500 can include one or more memory devices having structures as discussed with respect to the memory array 200 of FIG. 2, the memory array 300 of FIG. 3, and the memory device 400 of FIG. 4.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a CPU, a GPU, a hardware processor core, or any combination thereof, such as the memory processing device 115, etc.), a main memory 504 and a static memory 506, some or all of which may communicate with each other via an interlink (e.g., bus) 508. The machine 500 may further include a display unit 510, an alphanumeric input device 512 (e.g., a keyboard), and a user interface (1.11) navigation device 514 (e.g., a mouse). In an example, the display unit 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., USB, parallel, or other wired or wireless (e.g., infrared (IR), near field communication (NFC), etc.) connection to communicate or control one or more peripheral devices (e.g., a printer, card reader, etc.).

The machine 500 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine readable medium 522. The instructions 524 can include instructions for parity management. Such parity management can include handling parity data with respect to groups of access lines.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., EPROM, EEPROM) and flash memory devices; magnetic disks, such as internal hard disks and removable disks; magneto-optical disks; and compact disc-ROM (CD-ROM) and digital versatile disc-read only memory (DVD-ROM) disks.

The instructions 524 software, programs, an OS, etc.) or other data stored on the storage device 521 can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. UPS devices, including controllers and firmware, communicate with a host device using a low-voltage differential signaling (LVDS) serial interface with dedicated read write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of storing, encoding or carrying instructions for execution by the machine 500, and includes digital or analog communications signals or other tangible medium to facilitate communication of such software.

Overprovisioning reduction and performance enhancement for a parity data scheme can be achieved by implementing a technique that does not store any permanent parity data on a NAND memory device. By not storing permanent parity data on a NAND memory device, there is no NAND capacity loss with respect to data storage. This can lead to better performance than conventional approaches.

Figure 6:
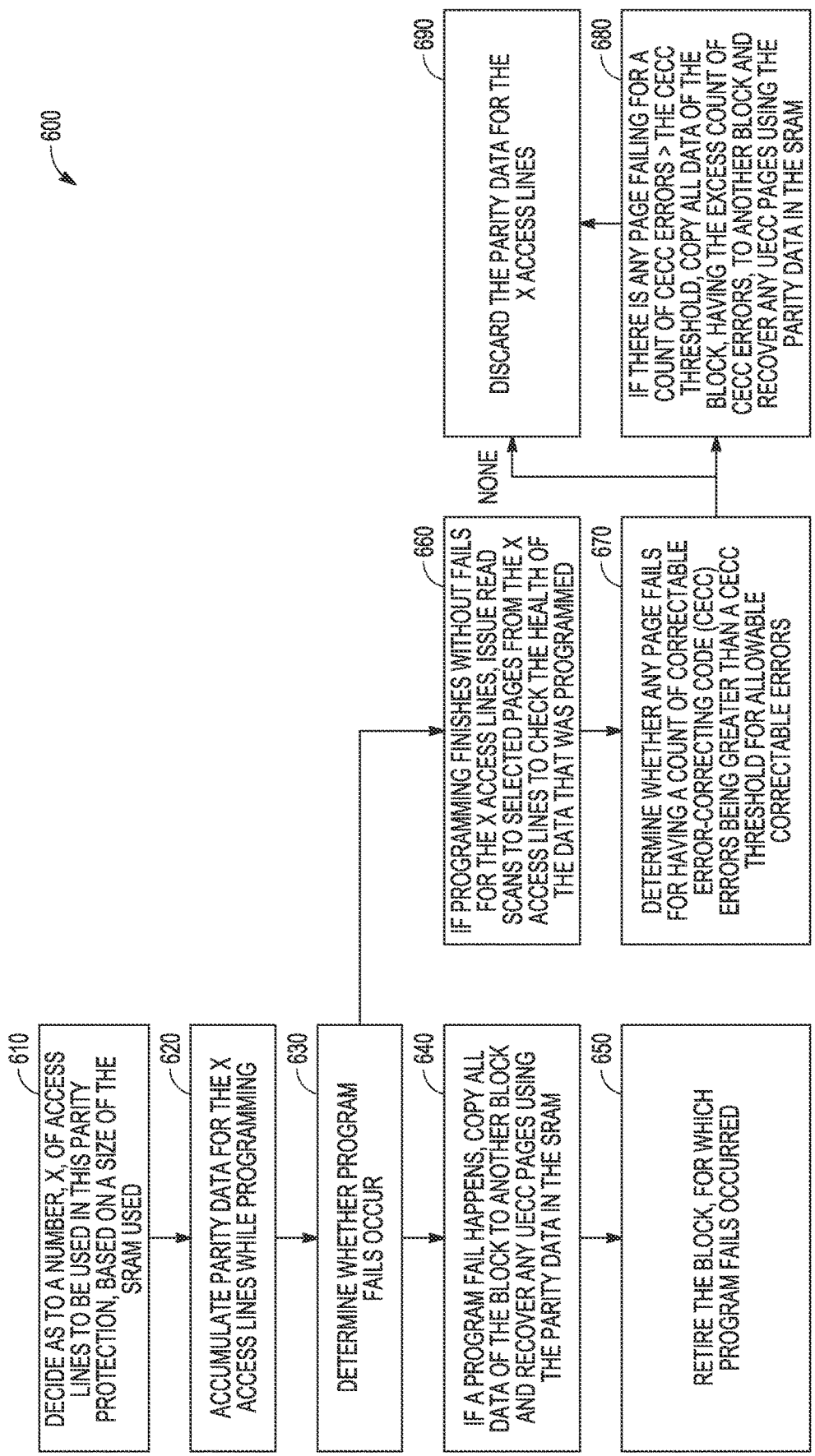
FIG. 6 shows an example parity protection scheme for comparable count of uncorrectable error-correcting code errors with and without program fails with respect to a NAND memory system, according to various embodiments.

In an embodiment, an example approach can be taken with respect to a NAND memory device that has an even ratio of a count of PF+UECC errors with respect to a count of UECC without PF. FIG. 6 shows an embodiment of an example parity data protection scheme 600 for comparable count of UECC errors with and without PF with respect to a NAND memory system. The example parity data protection scheme 600 can be implemented with respect to the environment 100 of FIG. 1. The example parity data protection scheme 600 can be implemented with respect to one or more memory devices having structures as discussed with respect to the memory array 200 of FIG. 2, the memory array 300 of FIG. 3, and the memory device 400 of FIG. 4.

At 610, a decision can be made as to a number, X, of access lines (WLs) to be used in this parity data protection, based on a size of the volatile memory used. For example, the volatile memory can be a SRAM. With a processing device of a managed. NAND system, such as a memory controller, including a SRAM or other form of volatile memory, as data comes to the processing device from a host, the data can be directed to the SRAM for parity data determination and from the SRAM to a block in which the data is being written.

The number, X, of WLs for which to provide data protection can be determined as being a divisor of the total number of WLs in a NAND block of the memory system. In a memory system, a typical NAND die can have multiple planes and multiple dies can be in a single drive, such as in a managed NAND system. Consider, for example, a NAND block of a memory system having sixty-four WLs. Divisors of sixty-four include X=1, 2, 4, 8, 16, 32, and 64, but X, as a divisor, cannot be 3, 5 ,6, 7, 9, . . . 15, 17 . . . 31, 33 . . . or 63. Then, the number, X, of WLs for which to provide data protection can be 1, 2, 4, 8, 16, 32, or 64. The number X is the number of access lines used on a group basis. In providing data protection using groups of access lines, a number of access lines in a group can be equal to a total number of access lines in a memory block divided by a selected positive integer such that the division of the total number of access lines in the memory block by the selected positive integer is a resulting positive integer. The selected positive integer is the number of groups used in the parity data protection scheme for the NAND block.

At 620, parity data for the X WLs is accumulated while programming. This accumulated parity data can be stored in a volatile memory, such as a SRAM. At 630, a determination is made as to whether PF occurred. At 640, if a program fail happens, all data of the block is copied to another block and any UECC pages are recovered using the parity data in the SRAM. At 650, the block, for which the PF occurred, is retired.

At 660, if programming finishes without fails for the X WLs, read scans are issued to selected pages from the X WLs to check the health of the data that was programmed. At 670, a determination is made as to whether any page fails for having a count of correctable error-correcting code (CECC) errors being greater than a CECC threshold for allowable correctable errors. At 680, if there is any page failing for a count of CECC errors greater than the CECC threshold, all data of the block, having the excess count of CECC errors, is copied to another block and any UECC pages are recovered using the parity data in the SRAM. At 690, the parity data for the X WLs can be discarded at this point. In addition, the block having the excess count of CECC errors can continue to be used in future programming. The future programming can be allowed by identifying this block as available. Since the programming has finished for the X WLs, parity data is discarded and parity data for a next set of X WLs, which is a next group of X WLs, is accumulated while programming.

Figure 7:
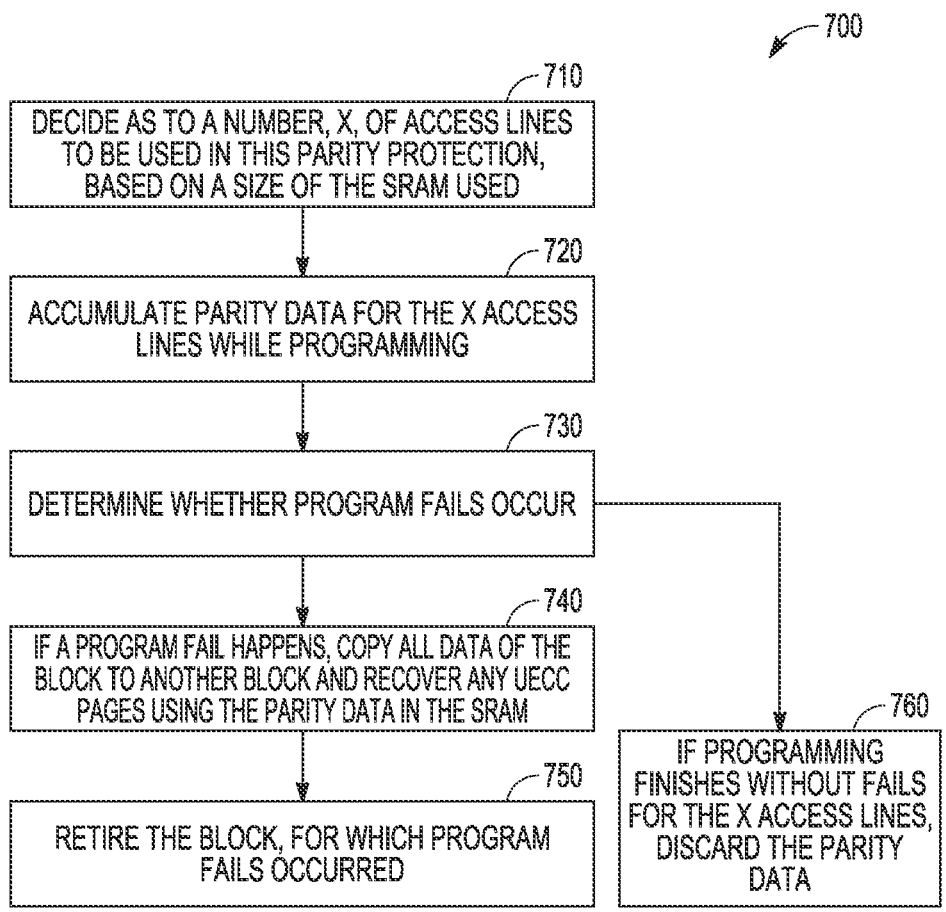
FIG. 7 shows an example parity protection scheme for a NAND memory system that has more program fails plus uncorrectable error-correcting code errors than uncorrectable error-correcting code errors without program fails, according to various embodiments.

FIG. 7 shows an embodiment of an example parity data protection scheme 700 for a NAND memory system that has more PF+UECC errors than UECC errors without PF. The example parity data protection scheme 700 can be implemented with respect to the environment 100 of FIG. 1. The example parity data protection scheme 700 can be implemented with respect to one or more memory devices having structures as discussed with respect to the memory array 200 of FIG. 2, the memory array 300 of FIG. 3, and the memory device 400 of FIG. 4.

At 710, a decision can be made as to a number, X, of WLs tot be used in this parity data protection, based on a size of the SRAM used. In parity data protection scheme 700, as with parity data protection scheme 600, the number, X, of WLs for which to provide data protection can be determined as being a divisor of the total number of WLs in a NAND block of the memory system. At 720, parity data for X WLs is accumulated while programming. At 730, a determination is made as to whether PF occurred. At 740, if a program fail happens, all data of the block is copied to another block and any UECC pages are recovered using the parity data in the SRAM. At 750, the block, for which the PF occurred, is retired.

At 760, if programming finishes without fails for the X WLs, parity data can be discarded at this point. Since the programming has finished for the X WLs, parity data is discarded and parity data for a next set of X WLs is accumulated while programming.

Figure 8:
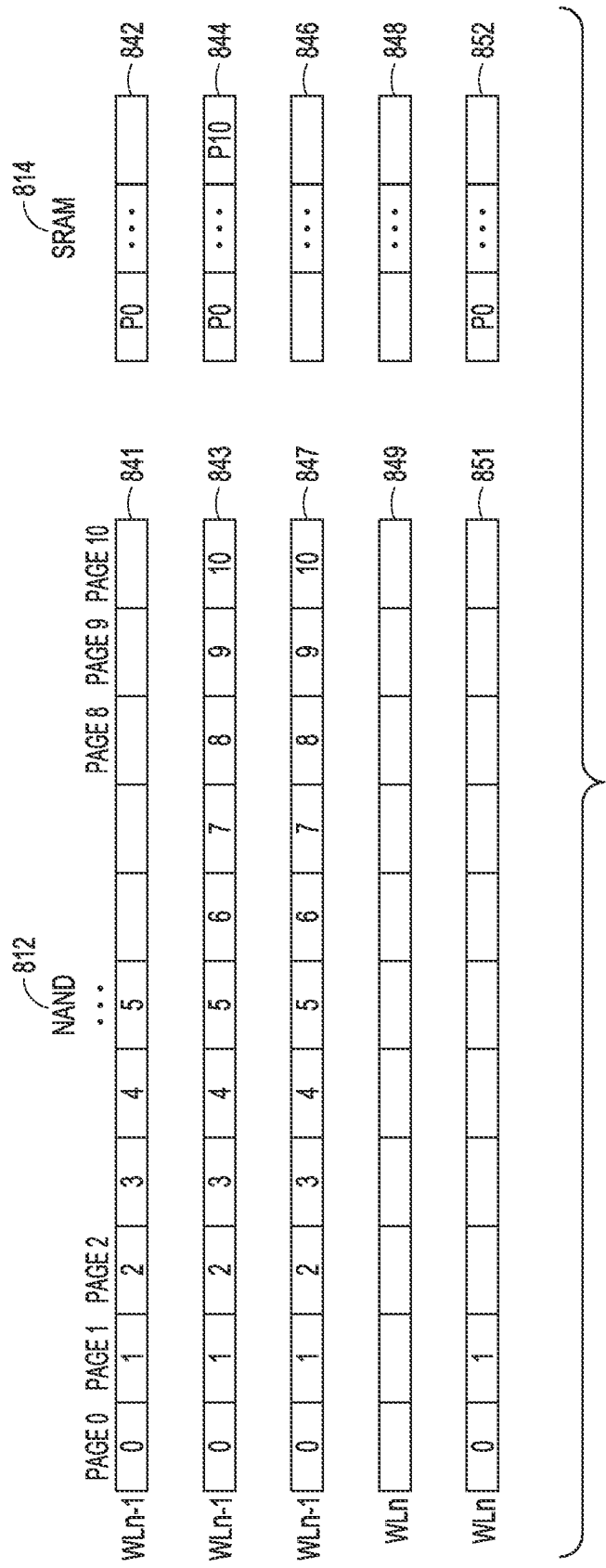
FIG. 8 is an illustration of an example relationship between programming in a NAND memory system and storing parity data in an associated SRAM at different functional times, according to various embodiments.

FIG. 8 is an illustration of an embodiment of an example relationship between programming in a NAND memory system and storing parity data in an associated SRAM at different functional times. The example relationship can be implemented with respect to the environment 100 of FIG. 1. The example relationship can be implemented with respect to one or more memory devices having structures as discussed with respect to the memory array 200 of FIG. 2, the memory array 300 of FIG. 3, and the memory device 400 of FIG. 4. In this example, it is assumed that there are eleven pages in one WL and as the WL is programmed on all NAND dies of the memory system, parities are accumulated in a SRAM 814. One page is programmed on all planes and all dies together. In this example, for ease of presentation, programming is performed in groups of access lines in which each group has one access line. The page-access line allocation 841 for a is shown at functional time at which data is being programmed into a NAND 812 and parity data is generated with parity allocation 842 in SRAM 814 but has not completed. A parity data P0 has been generated, where P0 is the parity data of page 0 for all planes and all dies.

As the programming continues with storage of parity data in the SRAM 814, if a program fail happens on any page that corrupts previous pages on the same access line, all corrupted data can be recovered using the parity data in the SRAM 814. A page-access line allocation 843 is shown at a functional time after the programming of the last page of the $WL_{n-1}$ on the last die finishes successfully, with a parity allocation 844 of the SRAM 814 in which panties P0 . . . P10 for each of page 0 . . . page 10, respectively, have been stored. With the successful finishing of the programming, a read scan can be issued to selected pages to verify that data is good. If any page is found to have a UECC error, a processing device, executing instructions stored therein or instructions of firmware, can relocate all data on this block and recover the UECC data using the parity data in the SRAM 814. If read scan on all of the selected pages pass, the parity data in the SRAM 814 can be discarded as shown by the page-access line allocation 847 having all eleven pages filled with data and the parity allocation 846 of the SRAM 814 being empty of parity data. As noted above with respect to this example, one WL is in each group of access lines, where the number of access lines in a given group can be defined by a divisor of the total number of access lines for a block of memory of a NAND device. For the number of access lines in a group being greater than one, pages for all access lines in a group are programmed with their respective parity data loaded into the SRAM 814. If read scans on all of the selected pages for access lines of the group of access lines pass, the parity data in the SRAM 814 is discarded.

With the parity data in the SRAM 814 now discarded, the processing device, executing instructions stored therein or instructions of firmware, now can move to the next group of access lines for programming. At this functional time before programming the next group of access lines, a page-access line allocation 849 for a $WL_n$ (the next group having a one access line member is shown as empty of data programmed in the pages for $WL_n$ with parity allocation 848 in SRAM 814 also empty. Programming is started for this next group of access lines including accumulating parities from an initial beginning point again, also referred to as starting from scratch. The page-access line allocation 851 for a $WL_n$ is shown at a functional time at which data is being programmed into the NAND 812, following an emptying of parity data from the NAND 812 after programming using $WL_{n-1}$, and parity data is generated with parity allocation 852 in SRAM 814, but has not completed.

Figure 9:
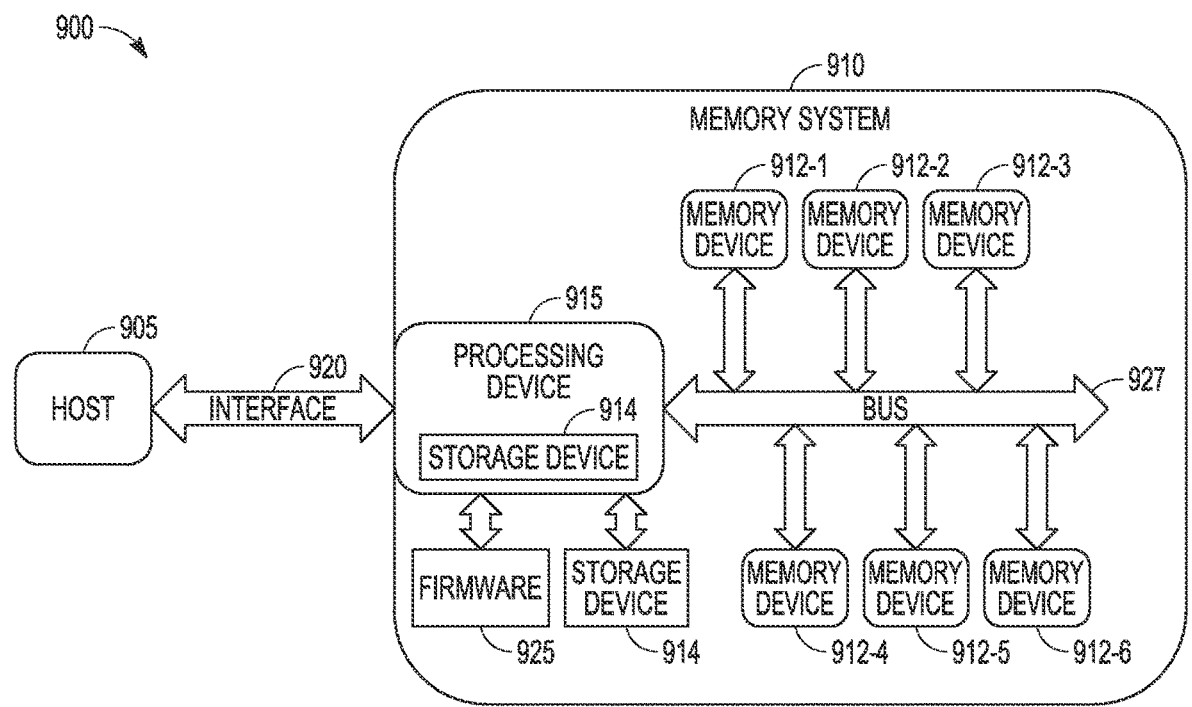
FIG. 9 is an illustration of an example relationship between programming in a NAND memory system and storing parity data in an associated SRAM at different functional times, according to various embodiments.

FIG. 9 is a block diagram of an embodiment of example system 900 including a host 905 that operates with a memory system 910 that uses a parity data protection while programming the memory system 910. The example system 900 can be implemented with respect to the environment 100 of FIG. 1. The example system 900 can be implemented with respect to one or more memory devices having structures as discussed with respect to the memory array 200 of FIG. 2, the memory array 300 of FIG. 3, and the memory device 400 of FIG. 4.

In this example embodiment, the host 905 is coupled to the memory system 910 by an interface 920. The memory system 910 can include a processing device 915 coupled to memory devices 912-1, 912-2, 912-3, 912-4, 912-5, and 912-6 by a bus 927. The memory devices 912-1, 912-2, 912-3, 912-4, 912-5, and 912-6 may be NAND memory devices. Though six memory devices are shown in FIG. 9, the memory system 910 can be implemented with less or more than six memory devices, that is memory system 910 can comprise one or more memory devices. The memory devices can be realized in a number of formats including but not limited to a plurality of memory dies. The processing device 915 can include or be structured as one or more processors.

In the example system 900, the processing device 915 is configured (e.g., hardware and/or software implementation) to perform the parity data scheme methods described herein, including the exemplary methods described with reference to FIGS. 6-8 and 10. For example, the processing device 915 can store instructions for performing the parity data schemes described herein. The instructions can be stored external to the processing device 915. The processing device 915 can comprise code executable by the processing device 915 to at least manage the memory devices 912-1, 912-2, 912-3, 912-4, 912-5, and 912-6. In the present example, the instructions are included in firmware 925. The firmware 925 can reside in a storage device of the memory system 910 coupled to the processing device 915. The firmware 925 can be coupled to the processing device 915 using the bus 927 or some other interface on the memory system 910. Alternatively, the firmware 925 can reside in the processing device 915 or can be distributed in the memory system 910 with firmware components, such as but not limited to code, including one or more components in the processing device 915. The firmware 925 can include code having instructions, executable by the processing device 915, to operate on the memory devices 912-1, 912-2, 912-3, 912-4, 912-5, and 912-6. The instructions, executable by the processing device 915, can include instructions to execute parity data protection for data programmed into memory devices of the memory system 910, as taught herein, where a storage device 914 is used to handle parity data. The parity data scheme can be implemented as a RAIN scheme.

The system 900 and its components can be structured in a number of different arrangements. For example, the system 900 can be arranged with a variation of the type of components that comprise the host 905, the interface 920, the memory system 910, the memory devices 912-1, 912-2, 912-3, 912-4, 912-5, and 912-6, the processing device 915, and the bus 927. The host 905 can comprise one or more processors, which can vary in type. The interface 920 can be arranged as, but not limited to, a PCIe interface. The memory system 910 can be, but is not limited to, a SSD. The memory devices 912-1, 912-2, 912-3, 912-4, 912-5, and 912-6 can be NAND memory devices. The processing device 915 can include or be structured as one or more types of processors compatible with the memory devices 912-1, 912-2, 912-3, 912-4, 912-5, and 912-6. The bus 927 can be an open NAND flash interface (ONFI) bus for the memory devices 912-1, 912-2, 912-3, 912-4, 912-5, and 912-6 with these Memory devices being NAND flash memory devices. The storage device 914 can be or included in a volatile storage device such as, but not limited to, a SRAM. As shown, storage device 914 can be external to processing device 915 in memory system 910 in FIG. 9 or the storage device 914 may be integrated into the processing device 915. The storage device 914 can be coupled to the bus 927 for communication with other components of the memory system 910. Alternatively, the storage device 914 can be coupled with processing device 915 in which the processing device 915 handles communications between the storage device 914 and other components of the memory system 910. The storage device 914 can be coupled to the bus 927 and to the processing device 915.

In various embodiments, the processing device 915 can have stored instructions or the firmware 925 can have stored instructions, executable by the processing device 915, to operate on the memory devices 912-1, 912-2, 912-3, 912-4, 912-5, and 912-6, where each memory device includes an array of memory cells organized into one or more planes, and the memory devices can be organized into multiple blocks, where each block has multiple pages. The instructions can be executed to: perform operations to program data into a memory block of a memory device using groups of access lines such that the programming of data using one group of access lines is completed before programming of data using another group of the groups of access lines; store parity data, in a storage device, while programming using a first group of access lines of the groups of access lines;

discard the parity data from the storage device upon determination that a criterion has been met in the programming using the first group of access lines of the groups of access lines; and accumulate other parity data in the storage device, after discarding the parity data stored from programming using the first group of access lines, while programming using a second group of access lines of the groups of access lines, the second group of access lines being different from the first group of access lines. The criterion can include no program fails or UECC errors at an end of programming at a last access line of the first group of access lines.

The groups of access lines can include groups in addition to the first and second groups of access lines in the memory device such that parity data from. programming using each group of access lines of the groups of access lines is stored in the storage device and discarded from the storage device upon determination that the criterion has been met in the programming using each respective group before accumulation of parity data from programming using another group of access lines of the groups of access lines in the memory device. Each group of access lines of the groups of access lines can have an equal number of access lines and a total number of groups of access lines can be based on a total number of access lines of the memory block of the memory device.

Figure 10:
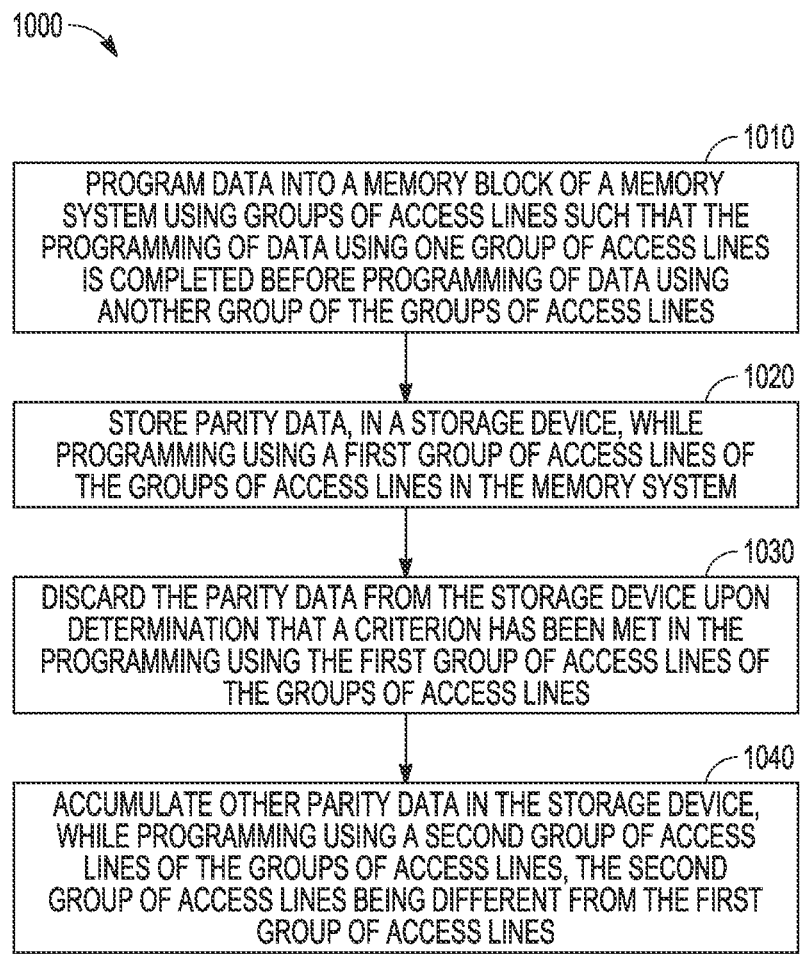
FIG. 10 is a flow diagram of features of an example method of conducting parity protection while programming a memory system, according to various embodiments.

FIG. 10 is a flow diagram of features of an embodiment of an example method 1000 of conducting parity data protection while programming a memory system. The example method 1000 can be implemented with respect to the environment 100 of FIG. 1. The example method 1000 can be implemented with respect to one or more memory devices having structures as discussed with respect to the memory array 200 of FIG. 2, the memory array 300 of FIG. 3, and the Memory device 400 of FIG. 4.

At 1010, data is programmed into a memory block of a memory system using groups of access lines such that the programming of data using one group of access lines is completed before programming of data using another group of the groups of access lines. At 1020, parity data is stored in a storage device, while programming using a first group of access lines of the groups of access lines in the memory system. At 1030, the parity data is discarded from the storage device upon determination that a criterion has been met in the programming using the first group of access lines of the groups of access lines. The criterion can include no program fails or UECC. errors at an end of programming at a last access line of the first group of access lines. At 1040, other parity data is accumulated in the storage device while programming using a second group of access lines of the groups of access lines, where the second group of access lines is different from the first group of access lines.

Variations of the method 1000 or methods similar to the method 1000 can include a number of different embodiments that may be combined depending on the application of such methods and/or the architecture of systems in which such methods are implemented. Such methods can include determining a number of access lines in the first group of access lines based on a size of the storage device. Such methods can include, upon determination that programming using the first or the second groups of access lines failed, copying all data of the memory block to another memory block of the memory system and recovering pages with UECC errors in the memory block using the parity data in the storage device. Such methods can include retiring the memory block after recovering with UECC errors and copying the data to the other memory block.

Variations of the method 1000 or methods similar to the method 1000 can include issuing read scans to selected pages of the memory block programmed using the first group of access lines upon determination that programming using the first group of access lines finishes without fails. Upon determination that a page of the pages has a correctable error correction code error count greater than a threshold of an allowable correctable error correction code error count, all data of the memory block can be copied to another memory block of the memory system and pages with UECC errors in the memory block can be recovered using the parity data in the storage device. Such methods can include making the memory block available for subsequent data storage and discarding the parity data in the storage device after recovering with UECC errors and copying the data to the other memory block.

In various embodiments, a system can comprise firmware having stored instructions, executable by a processing device, to perform operations to: program data into a memory block of a memory device using groups of access lines such that the programming of data using one group of access lines is completed before programming of data using another group of the groups of access lines; store parity data, in a storage device, while programming using a first group of access lines of the groups of access tines; discard the parity data from the storage device upon determination that a criterion has been met in the programming using the first group of access lines of the groups of access tines; and accumulate other parity data in the storage device, after discarding the parity data stored from programming using the first group of access lines, while programming using a second group of access lines of the groups of access lines, the second group of access lines being different from the first group of access lines. The criterion can include no program fails or UECC errors at an end of programming at a last access line of the first group of access lines.

Variations of such a system can include a number of different embodiments that may be combined depending on the implementation for which such systems are designed. Such systems can include the groups of access lines to include groups in addition to the first and second groups of access lines in the memory device such that parity data from programming using each group of access lines of the groups of access lines is stored in the storage device and discarded from the storage device upon determination that the criterion has been met in the programming using each respective group before accumulation of parity data from programming using another group of access lines of the groups of access lines in the memory device. Each group of access lines of the groups of access lines can have an equal number of access lines and a total number of groups of access tines is based on a total number of access lines of the memory block of the memory device. In various embodiments, the system can include the processing device. The storage device can be a SRAM disposed in the processing device.

In various embodiments, a system can comprise a processing device, a memory system having a number of memory devices organized into one or inure memory blocks, a storage device separate from the memory devices of the memory system, and firmware having stored instructions, executable by the processing device, to perform operations. The operations can include operations to: program the memory system by use of a first group of access lines of groups of access lines in the memory system; accumulate parity data in the storage device while programming using the first group of access lines of the groups of access lines; discard the parity data in the storage device upon determination that a criterion has been met in the programming using the first group of access lines of the groups of access lines; and accumulate other parity data in the storage device, after discarding the parity data stored from programming using the first group of access lines of the groups of access lines, while programming using a second group of access lines of the groups of access lines, the second group of access lines being different from the first group of access lines. The criterion can include no program fails or UECC errors at an end of programming at a last access line of the first group of access lines.

Variations of such a system can include a number of different embodiments that may be combined depending on the implementation for which such systems are designed. Such systems can include the firmware having operations to conduct read verify of selected pages of the memory system corresponding to the first group of access lines after programming finishes at the end of programming using the first group of access lines. The operations of the firmware can include operations to: program a memory block of the one or more memory blocks in a sequence starting with programming using the first group of access lines followed by programming using the second. group of access lines and ending with programming using a last group of access lines of the groups of access lines, with the total number of groups of access lines based on a total number of access lines of the memory block; accumulate parity data in the storage device from programming using each group of access lines of the groups of access lines; and discard the parity data in the storage device, from programming using each group of access lines of the groups of access lines, between programming in the sequence. The firmware operations can include operations to proceed in the sequence upon determination that there are no program fails or uncorrectable error-correcting code errors at an end of programming at a last access tine of each group of access lines of the groups of access lines.

Variations of such a system can include the number of access lines in the first group of access lines being equal to a total number of access lines in a memory block divided by a selected positive integer such that the division of the total number of access lines in the memory block by the selected positive integer is a resulting positive integer. The storage device of the system can be a volatile storage device. The volatile storage device can be a SRAM. In various embodiments, the memory system can include multiple memory dies with each memory die arranged as multiple planes of memory cells, and accumulation of parity data in the storage device can include storage of parity data of a page for all planes and all dies of the multiple memory dies. The multiple memory dies can be multiple NAND memory dies.

The following are example embodiments of systems and methods, in accordance with the teachings herein.

An example storage device 1 can comprise: a storage array, including non-volatile memory cells accessible through access lines; an additional memory array; a controller, including a processor configured to execute instructions stored within the storage device, wherein execution of the instructions by the processor cause the processor to perform operations, the operations comprising: programming data into the storage array using multiple groups of access lines such that the programming of data using a first group of access lines is completed before programming of data using a second group of access lines; storing parity data, in the additional memory array, while programming using the first group of access lines; discarding the parity data from the additional memory array upon determination that a criterion has been met in the programming using the first group of access lines; and accumulating other parity data in the storage device, after discarding the parity data stored from programming using the first group of access lines, while programming using the second group of access tines of the groups of access lines, the second group of access lines being different from the first group of access lines.

An example storage device 2 can include features of example storage device 1 and can include the criterion to include no program fails or uncorrectable error-correcting code errors at an end of programming at a last access line of the first group of access lines.

An example storage device 3 can include features of any of the preceding example storage devices and can include the groups of access lines to include groups in addition to the first and second groups of access lines in the memory device such that parity data from programming using each group of access lines of the groups of access lines is stored in the storage device and discarded from the storage device upon determination that the criterion has been met in the programming using each respective group before accumulation of parity data from programming using another group of access lines of the groups of access lines in the memory device.

An example storage device 4 can include features of any of the preceding example storage devices and can include each group of access lines of the groups of access lines having an equal number of access lines and a total number of groups of access lines being based on a total number of access lines of the memory block of the memory device.

An example storage device 5 can include features of any of the preceding example systems and can include the storage device being a static random access memory disposed in the processing device, An example memory system 1 can comprise: a number of memory devices organized into one or more memory blocks; a storage device separate from the memory devices; and a processor configured to execute instructions stored within the memory system, wherein execution of the instructions by the processor cause the processor to perform operations, the operations comprising: programming the number of memory devices by use of a first group of access lines of groups of access lines in the number of memory devices; accumulating parity data in the storage device while programming using the first group of access lines of the groups of access lines; discarding the parity data in the storage device upon determination that a criterion has been met in the programming using the first group of access lines of the groups of access lines; and accumulating other parity data in the storage device, after discarding the parity data stored from programming using the first group of access lines of the groups of access lines, while programming using a second group of access lines of the groups of access lines, the second group of access lines being different from the first group of access lines.

An example memory system 2 can include features of example memory system 1 and can include the criterion to include no program fails or uncorrectable error-correcting code errors at an end of programming at a last access line of the first group of access lines.

An example memory system 3 can include features of any of the preceding example memory systems 1 and 2 and can include the operations to include conducting read verify of selected pages of the memory system corresponding to the first group of access lines after programming finishes at the end of programming using the first group of access lines.

An example memory system 4 can include features of any of the preceding example memory systems 1-3 and can include the number of access lines in the first group of access lines being equal to a total number of access lines in a memory block divided by a selected positive integer such that the division of the total number of access lines in the memory block by the selected positive integer is a resulting positive integer.

An example memory system 5 can include features of any of the preceding example memory systems 1-4 and can include the operations to include: programming a memory block of the one or more memory blocks in a sequence starting with programming using the first group of access lines followed by programming using the second group of access lines and ending with programming using a last group of access lines of the groups of access lines, with the total number of groups of access lines based on a total number of access lines of the memory block; accumulating parity data in the storage device from programming using each group of access lines of the groups of access lines; and discarding the parity data in the storage device, from programming using each group of access lines of the groups of access lines, between programming in the sequence.

An example memory system 6 can include features of any of the preceding example memory systems 1-5 and can include the operations to include proceeding in the sequence upon determination that there are no program fails or uncorrectable error-correcting code errors at an end of programming at a last access line of each group of access lines of the groups of access lines.

An example memory system 7 can include features of any of the preceding example memory systems 1-6 and can include the storage device being a volatile storage device.

An example memory system 8 can include features of any of the preceding example memory systems 1-7 and can include the volatile storage device being a static random access memory.

An example memory system 9 can include features of any of the preceding example memory systems 1-8 and can include the memory system to include multiple memory dies with each memory die arranged as multiple planes of memory cells, and accumulation of parity data in the storage device includes storage of parity data of a page for all planes and all dies of the multiple memory dies.

An example memory system 10 can include features of any of the preceding example memory systems 1-9 and can include the multiple memory dies being multiple NAND memory dies.

In an example system 1, any of the systems of example storage devices 1 to 5 and memory systems 1 to 10 may be adapted and operated to perform operations in accordance with any of the methods of example methods 1-8.

In an example system 2, any of the systems of example storage devices 1 to 5, memory systems 1 to 10, and example system 1 may include memory devices incorporated into an electronic system further comprising a host processor and a communication bus extending between the host processor and the memory device.

In an example system 3, any of the systems of example storage devices 1 to 5, memory systems 1 to 10, example system 1, and example system 2 may be modified to include any structure presented in another of example storage devices 1 to 5, memory systems 1 to 10, example system 1, and example system 3.

In an example system 4, any of apparatus of any of the example storage devices 1 to 5, memory systems 1 to 10, and example systems 1-3 may further include a machine-readable storage device configured to store instructions as a physical state, wherein the instructions may be used to perform one or more operations of the apparatus.

An example method 1 can comprise programming data into a memory block of a memory system using groups of access lines such that the programming of data using one group of access lines is completed before programming of data using another group of the groups of access lines; storing parity data, in a storage device, while programming using a first group of access lines of the groups of access lines in the memory system; discarding the parity data from the storage device upon determination that a criterion has been met in the programming using the first group of access lines of the groups of access lines; and accumulating other parity data in the storage device, while programming using a second group of access lines of the groups of access lines, the second group of access lines being different from the first group of access lines.

An example method 2 can include features of example method 1 and can include determining a number of access lines in the first group of access lines based on a sire of the storage device.

An example method 3 can include features of any of the preceding example methods and can include, upon determination that programming using the first or the second groups of access lines failed, copying all data of the memory block to another memory block of the memory system and recovering pages with uncorrectable error-correcting code errors in the memory block using the parity data in the storage device.

An example method 4 can include features of any of the preceding example methods and can include retiring the memory block after recovering with uncorrectable error-correcting code errors and copying the data to the other memory block.

An example method 5 can include features of any of the preceding example methods and can include: issuing read scans to selected pages of the memory block programmed using the first group of access lines upon determination that programming using the first group of access lines finishes without fails; upon determination that a page of the pages has a correctable error correction code error count greater than a threshold of allowable correctable error correction code error count, copying all data of the memory block to another memory block of the memory system and recovering pages with uncorrectable error-correcting code errors in the memory block using the parity data in the storage device.

An example method 6 can include features of any of the preceding example methods and can include making the memory block available for subsequent data storage and discarding the parity data in the storage device after recovering with uncorrectable error-correcting code errors and copying the data to the other memory block.

An example method 7 can include the criterion to include no program fails or uncorrectable error-correcting code errors at an end of programming at a last access line of the first group of access lines.

In an example method 8, any of the example methods 1-7 may be performed by an electronic system including a host processor and a communications interface extending between the host processor and a memory device.

In an example method 9, any of the example methods 1-8 may be modified to include operations set forth in any other of method examples 1-8.

In an example method 10, any of the example methods 1-9 may be implemented at least in part through use of instructions stored as a physical state in one or more machine readable storage devices.

An example method 11 can include features of any of the preceding example methods 1-10 and can include performing functions associated with any features of example systems 1-20.

An example non-transitory machine-readable medium can comprise instructions, which when executed by a set of processors cause a system to perform operations comprising features of any of the preceding example methods 1-7 and can include performing functions associated with any features of example systems 1-16.

In various examples, the components, controllers, processors, units, engines, or tables described herein can include, among other things, physical circuitry or firmware stored on a physical device. As used herein, "processor device" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, RAMs, ROMs, SSDs, UFS devices, eMMC devices, and the like.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Thus, the following claims are hereby incorporated into the Detailed Description, with each claim standing on its own as a separate embodiment.

What is claimed is:

1. A memory system comprising:
   a number of memory devices organized into one or more memory blocks;
   a storage device; and
   a processor configured to execute instructions stored within the memory system, wherein execution of the instructions by the processor cause the processor to perform operations, the operations comprising:
      programming first data and second data into the one or more memory blocks using a specific number of first access lines for the first data and the specific number of second access lines for the second data, the specific number based on a size of the storage device with the first access lines being different from second access lines;
      accumulating first parity data in the storage device for the first data while programming the first data; and
      in response to finishing the programming of the first data, discarding the first parity data from the storage device and accumulating second parity data in the storage device for the second data while programming the second data.

2. The memory system of claim 1, wherein finishing the programming of the first data includes completing programming at a last access line of the specific number of first access lines without program fails or uncorrectable error-correcting code errors in the programming of the first data.

3. The memory system of claim 1, wherein the memory system includes groups of access lines in addition to the first and second access lines such that parity data from programming using each group of access lines is stored in the storage device and discarded from the storage device before accumulation of parity data from programming using another group of the groups of access lines in the memory system.

4. The memory system of claim 3, wherein each group of access lines has an equal number of access lines and a total number of groups of access lines is based on a total number of access lines of the memory block of the memory system.

5. The memory system of claim 1, wherein the storage device is a volatile memory.

6. A memory system comprising:
   a number of memory devices organized into one or more memory blocks;
   a storage device separate from the memory devices; and
   a processor configured to execute instructions stored within the memory system, wherein execution of the instructions by the processor cause the processor to perform operations, the operations comprising:
      programming data into the one or more memory blocks using groups of access lines such that programming of the data using one group of access lines is completed before programming of the data using another group of the groups of access lines;
      storing parity data, in the storage device, while programming of the data using a first group of access lines of the groups of access lines in the memory system; and
      storing other parity data in the storage device, after discarding the parity data stored from programming using the first group of access lines, while programming the data using a second group of access lines of the groups of access lines, the second group of access lines being different from the first group of access lines.

7. The memory system of claim 6, wherein the processor is operable to discard the stored parity data, from programming using the first group of access lines, from the storage device in response to finishing the programming using the first group of access lines at a last access line of the first group of access lines, without program fails or uncorrectable error-correcting code errors in the programming using the first group of access lines.

8. The memory system of claim 6, wherein the processor is operable to conduct read verify of selected pages of the number of memory devices corresponding to the first group of access lines after programming finishes using the first group of access lines and before programming using the second group of access lines.

9. The memory system of claim 6, wherein the number of access lines in the first group of access lines is equal to a total number of access lines in a memory block divided by a selected positive integer such that division of a total number of access lines in the memory block by the selected positive integer is a resulting positive integer.

10. The memory system of claim 6, wherein the processor is operable to:
program a memory block of the one or more memory blocks in a sequence starting with programming using the first group of access lines followed by programming using the second group of access lines and ending with programming using a last group of access lines of the groups of access lines, with a total number of groups of access lines based on a total number of access lines of the memory block;
accumulate parity data in the storage device from programming using each group of access lines of the groups of access lines: and
discard the parity data in the storage device, from programming using each group of access lines of the groups of access lines, between programming in the sequence.

11. The memory system of claim 6, wherein the processor is operable to, upon determination that programming of the data into a first memory block of the one or more memory blocks using a group of the groups of access lines failed, copy all data of the first memory block to another memory block of the memory system and recover pages with uncorrectable error-correcting code errors in the first memory block using the parity data in the storage device.

12. The memory system of claim 11, wherein the processor is operable to retire the first memory block after recovering with uncorrectable error-correcting code errors and copying the data to the other memory block.

13. The memory system of claim 6, wherein the processor is operable to:
issue read scans to selected pages of a memory block of the one or more memory blocks programmed using the first group of access lines upon determination that programming using the first group of access lines occurred without fails; and
upon determination that a page of the selected pages has a correctable error correction code error count greater than a threshold of allowable correctable error correction code error count, copy all data of the memory block of the one or more memory blocks to another memory block of the memory system and recover pages with uncorrectable error-correcting code errors in the memory block using the parity data in the storage device.

14. The memory system of claim 13, wherein the processor is operable to:
make the memory block of the one or more memory blocks available for subsequent data storage; and
discard the parity data in the storage device after recovering with uncorrectable error-correcting code errors and copying the data to the other memory block.

15. The memory system of claim 6, wherein the number of memory devices includes multiple memory dies with each memory die arranged as multiple planes of memory cells, and storing parity data in the storage device includes storing parity data of a page for all planes and all dies of the multiple memory dies.

16. A method of programming data in a memory system, the method comprising:
programming data into a memory block of the memory system using groups of access lines, with each group of access lines having a same number of access lines, such that the programming of the data using one group of access lines is completed before programming of the data using another group of the groups of access lines;
storing parity data in a storage device while programming the data using a first group of access lines of the groups of access lines in the memory system; and
storing, after discarding the parity data from the storage device from the programming using the first group of access lines, other parity data in the storage device, while programming the data using a second group of access lines of the groups of access lines, the second group of access lines being different from the first group of access lines.

17. The method of claim 16, wherein discarding the parity data from the storage device includes discarding the parity data from the storage device in response to finishing the programming using the first group of access lines at a last access line of the first group of access lines, without program fails or uncorrectable error-correcting code errors in the programming using the first group of access lines.

18. The method of claim 16, wherein the method includes determining the same number of access lines based on a size of the storage device.

19. The method of claim 16, wherein the method includes:
issuing read scans to selected pages of the memory block programmed using the first group of access lines upon determination that programming using the first group of access lines finishes without fails; and
upon determination that a page of the pages has a correctable error correction code error count greater than a threshold of an allowable correctable error correction code error count, copying all data of the memory block to another memory block of the memory system and recovering pages with uncorrectable error-correcting code errors in the memory block using the parity data stored in the storage device while programming using the first group of access lines.

20. The method of claim 19, wherein the method includes making the memory block available for subsequent data storage and discarding the parity data in the storage device after recovering with uncorrectable error-correcting code errors and copying the data to the other memory block.

* * * * *